July 15, 1958 — I. I. SIKORSKY — 2,843,345
DUAL PURPOSE LANDING GEAR
Filed June 14, 1955 — 3 Sheets-Sheet 1

INVENTOR
I. I. SIKORSKY
BY M. B. Tasker
ATTORNEY

July 15, 1958     I. I. SIKORSKY     2,843,345
DUAL PURPOSE LANDING GEAR

Filed June 14, 1955     3 Sheets-Sheet 3

INVENTOR
I. I. SIKORSKY
BY M. B. Tasker
ATTORNEY

United States Patent Office 2,843,345
Patented July 15, 1958

2,843,345

DUAL PURPOSE LANDING GEAR

Igor I. Sikorsky, Easton, Conn., assignor to United Aircraft Corporation, East Hartford, Conn., a corporation of Delaware Application June 14, 1955, Serial No. 515,360

12 Claims. (Cl. 244—103)

This invention relates to rotary wing aircraft and has as one of its objects the provision of improved means for landing such aircraft.

Ordinarily it is desirable to have wheeled landing gear on rotary wing aircraft since most landings are made under favorable conditions on prepared surfaces such as heliports or the decks of ships and the wheels are needed to permit ground handling of the aircraft. However, under many conditions of service rotary wing aircraft are obliged to land on soft ground where wheels do not provide sufficient area to properly support the craft. For instance, in landing in jungle clearings, often on marshy land, one wheel will sink in and cause the rotor blades to strike the ground resulting in serious damage or even in overturning. Under some conditions the ground may be so soft as to prevent a landing altogether.

It is an object of this invention to greatly extend the usefulness of rotary wing aircraft by providing landing gear capable of supporting the craft in very soft ground while retaining the advantages of wheels for ground handling and for landings made on firm surfaces.

Further use of the proposed device would be the ability to land on snow. If necessary, somewhat larger diameter wheels could be used in this case, still, however, offering excellent ordinary ground wheel characteristics and good protection when landing on snow with wheels turned horizontally.

Another object of the invention is to provide a rotary wing aircraft with wheeled landing gear having provision for ground engagement of the wheels while the wheels are in either vertical or horizontal planes.

Another object of the invention is to provide positive and reliable braking effect for the aircraft which may be desirable if any lateral movement after landing would represent inconvenience or danger, such as in the case of landing on uneven ground or on a moving or inclined shipboard platform and the like.

A further object is generally to improve the landing gear of rotary wing aircraft.

These and other objects and advantages of the invention will be pointed out or will be obvious from the following detailed description of a specific embodiment of the invention illustrated in the accompanying drawings.

Figure 1:
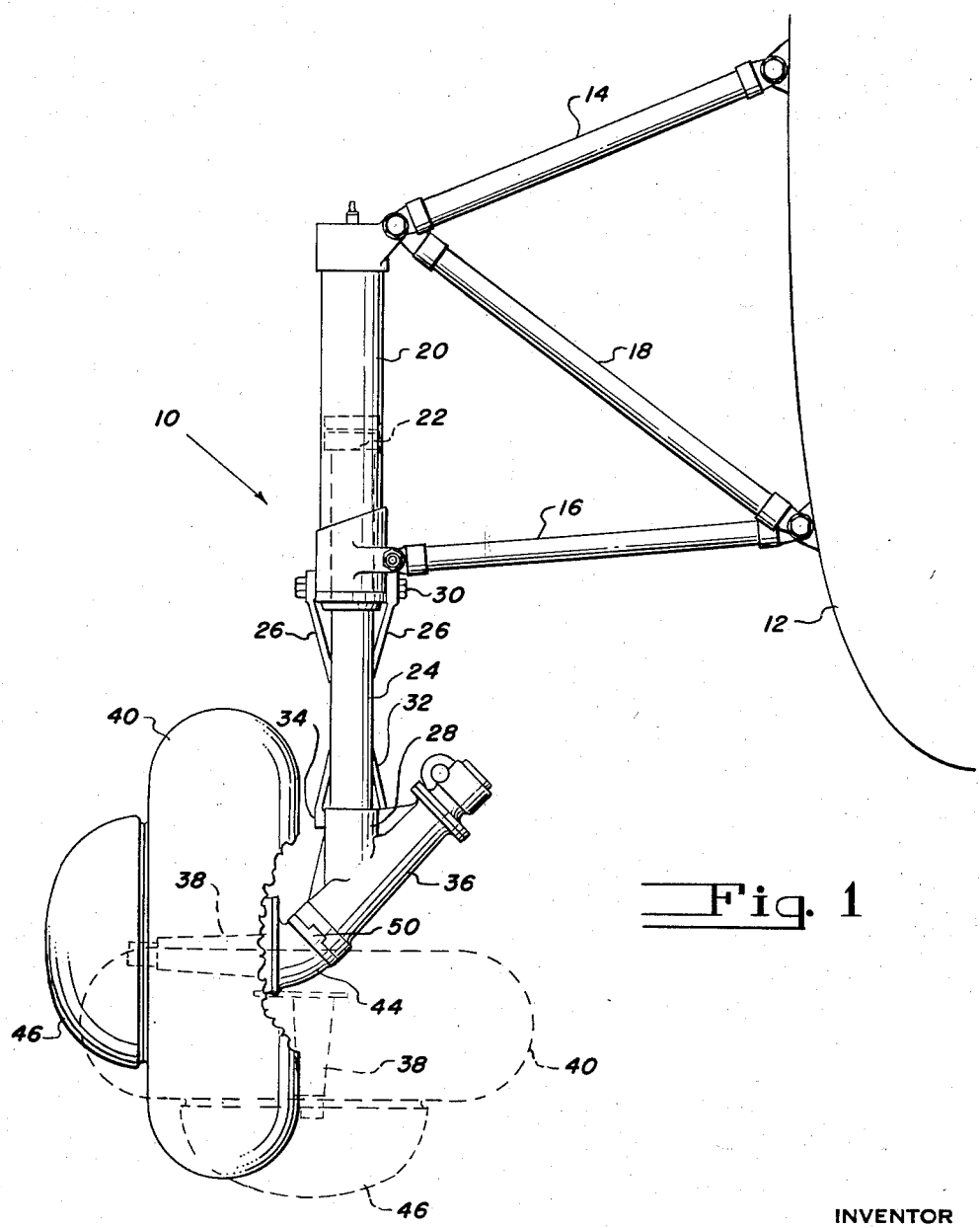
Fig. 1 is a rear view of one landing gear unit of a helicopter embodying the invention, showing the wheel in two positions.

Fig. 1 shows one of the main landing gear of a helicopter, generally indicated by the numeral 10, which is secured to the fuselage 12 by suitable linkage 14, 16 and 18. It will be noted that this landing gear is of the non-retractable type. Essentially the gear includes the usual oleo strut comprising a cylinder 20 in which a piston 22 is reciprocable. The piston is merely an enlargement of a movable rod element 24 which carries the support for the ground engaging member, or wheel, at its lower end. Cylinder 20 contains hydraulic fluid as well as a certain amount of air to provide a cushioning effect upon engagement of the wheel with the ground in landing.

Scissors 26 are provided between the cylinder 20 and a fitting 28 at their lower end of piston rod 24. The scissors consists of the usual pairs of links 26 pivoted to the cylinder at 30 and lower links 32 pivoted to fitting 28 at 34. The pairs of links 26 and 32 are pivotally connected at their adjacent ends to form a toggle linkage which permits the rod 24 to move in and out of the cylinder but prevents relative rotation of the cylinder and rod.

In accordance with this invention the fitting 28 has a tubular sleeve 36 formed integral therewith which lies at an angle of 45° to the axis of the oleo strut 10. The usual wheel axle 38 on which the wheel 40 is journalled has a 45° extension 42 which is journalled in the cylinder 36 as will be hereinafter more fully described. The extension 42 and the wheel axle 38 are integral and are connected by an enlarged portion 44, the angle between the extension 42 and the axle 38 being such that when the wheel 40 is in its normal position in which it rotates in vertical planes the axle 38 is horizontal. By rotating the extension 42 through an angle of 180° the axle 38 is moved into a vertical downwardly directed position in which the wheel 40 lies in horizontal planes. The wheel 40 is provided with a pneumatic bumper 46 which takes the place of the usual hub cap and is of very ample dimensions as shown in Fig. 1.

Means are provided for locking the wheel and axle assembly in each of its operative positions, i. e., the full line position shown in Fig. 1 in which the aircraft can be moved about on its wheels when on the ground and the dotted line position in which the wheel lies in horizontal planes with the bumper 46 in position to initially engage the ground in landing. This locking means is shown most clearly in Figs. 2, 4 and 5. The enlarged portion 44 of the axle assembly has a shallow flange 48 which forms a shoulder that normally abuts the end of sleeve 36. Flange 48 is provided with two locking lugs 50 which are diametrically disposed and engage in registering notches 52 (Fig. 4) in the end of sleeve 36, the notches and lugs being arranged so that the lugs are receivable in the notches in either of the two positions of the wheel above discussed.

Figure 3:
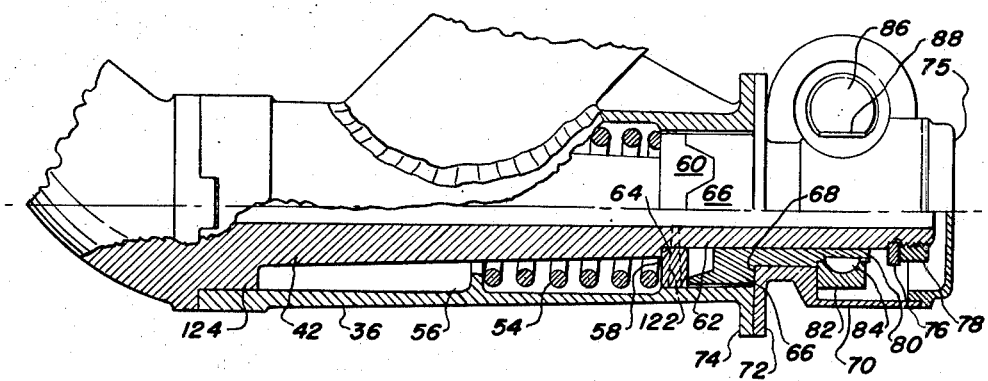
Fig. 3 is a view similar to Fig. 2 showing the mechanism in section.
Figure 4:
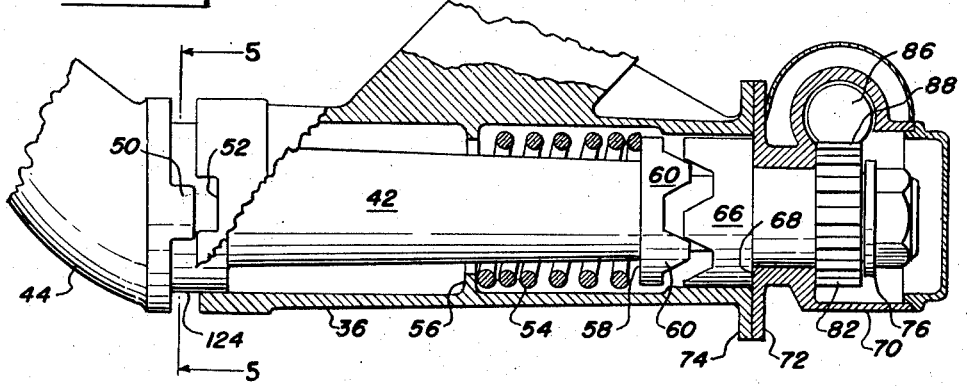
Fig. 4 is a view similar to Fig. 2 showing the parts just as the wheel position lock has been released and the rotation of the wheel axle has just started.
Figure 5:
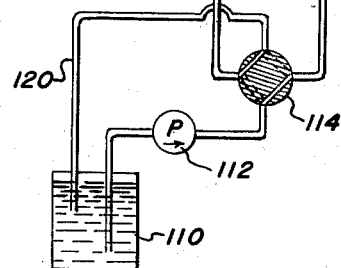
Fig. 5 is a section on line 5—5 of Fig. 4.
Figure 5:
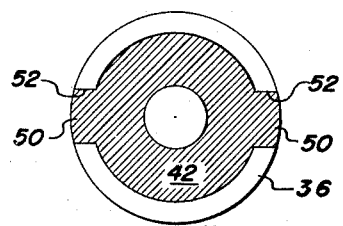

The lugs are normally held seated in notches 52 by a heavy compression spring 54, one end of which seats against an internal annular flange 56 on sleeve 36 and the other end of which engages a shoulder 58 formed by a cam member 60 which is carried by a reduced diameter end portion 62 of extension 42. As best shown in Fig. 3, the left-hand side of cam member 60 abuts the shoulder 64 formed by the reduced end portion 62 and on its right-hand side is provided with camming teeth which engage similar camming teeth in a cam member 66 in which the reduced portion 62 is journalled. The cam members are held in place in the sleeve 36 by shoulder 68 on a flanged housing member 70 having an annular flange 72 which is bolted to a similar annular flange 74 on sleeve 36. A cap member 75 forms an end closure for the pinion housing. End portion 62 of member 42 has a reduced threaded extremity on which an annular stop member 76 is secured by a nut 78. When the cam members 60 and 66 are fully meshed and the lugs 50 are seated in notches 52, stop member 76 is spaced axially from the end 80 of member 66. This axial spacing is such that the stop member engages the end 80 of member 66 as shown in Fig. 4 while the teeth of the cam members are still partially engaged. However, the lugs 50 upon engagement of stop 76 with the abutment 80 will have moved entirely out of the notches 52. It will thus be evident that the axial movement of member 42 against spring 54 permitted by the stop 76 is at least equal to the depth of the notches 52.

Hydraulically operated means is provided for rotating cam member 66. This includes a pinion 82 which is keyed to cam member 66 by a key 84 shown in Fig. 3. Pinion 82 is driven by a rack 86 which is essentially a cylindrical member having teeth 88 cut on one flattened face thereof. The rack is reciprocable in a housing 90 which carries two flanged extensions 92 and 94 which are secured to housing 90 by bolts 96 and 98. The rack which reciprocates in the housing 90 and extension 92 has a reduced diameter piston rod 100 carrying a piston 102 reciprocable in extension 94. A packing gland 104 is threaded into extension 92 and surrounds the piston rod 100 and seals off the cylinder from the rack housing. The cylindrical extension 94 has fluid connections 106 and 108 which communicate therewith on opposite sides of the piston 102.

Hydraulic fluid under pressure is supplied from reservoir 110 by a pump 112 through a usual hydraulic control valve 114. In the position of the valve shown in Fig. 6, pressure fluid from pump 112 flows through valve 114 and conduit 116 to fluid connection 106 and acts on the left-hand side of piston 102. At the same time fluid from the right-hand side of piston 102 flows through fluid connection 108, conduit 118, valve 114 and conduit 120 back to reservoir 110. By rotating valve 114 into its alternative position, shown in dotted lines, fluid from pump 112 will flow through valve 114 into conduit 118 and fluid connection 108 to move the piston in the opposite direction while fluid will return through fluid connection 106, conduit 116, valve 114 and conduit 120 to reservoir 110.

It will be evident that movement of the pinion 82 in either direction by rack 86 will drive cam member 66. There is also a rigid drive connection provided between cam member 60 and axle extension 42. To this end a tapered pin 122 extends through cam member 60 and into extension 42 as shown in dotted lines in Fig. 3. It will also be noted that axle extension 42 has an enlarged cylindrical portion 124 which forms a journal for this member in the sleeve 36 in which the portion 124 is axially slidable during movement of member 42 by the cam 66. Member 42 is journalled at its opposite end in cam member 66 which in turn is journalled in sleeve 36 and also in housing member 70.

As a result of this invention the pilot, as he approaches for a landing, has a choice of landing gear. If he is making a landing on a prepared surface, such as a heliport or any other firm terrain, he will leave the landing wheels in their vertical position so that normal ground handling procedures can be followed. However, if he is attempting a landing on soft ground he can, by moving valve 114, direct hydraulic fluid into the right-hand end of cylinder 94 through fluid connection 108 as previously described causing the rack 86 to move pinion 82 through an angle of 180° from the position shown in Figs. 2 and 6.

Figure 2:
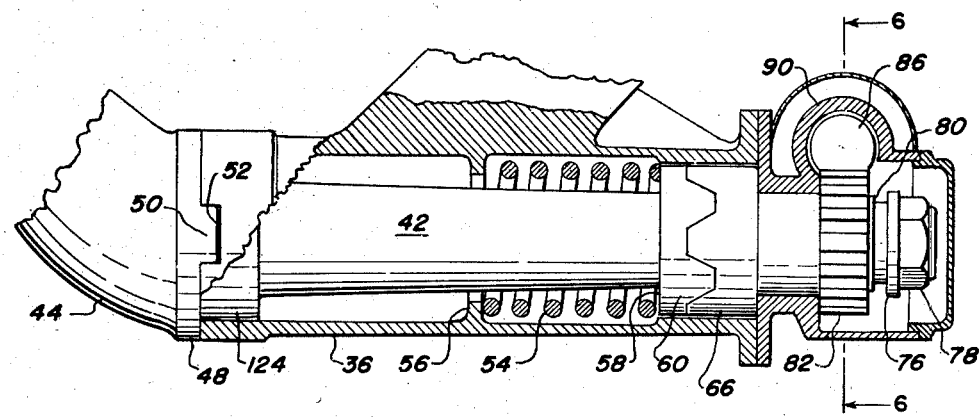
Fig. 2 is an enlarged detail view showing the lock release and wheel axle turning mechanism with parts broken away.
Figure 6:
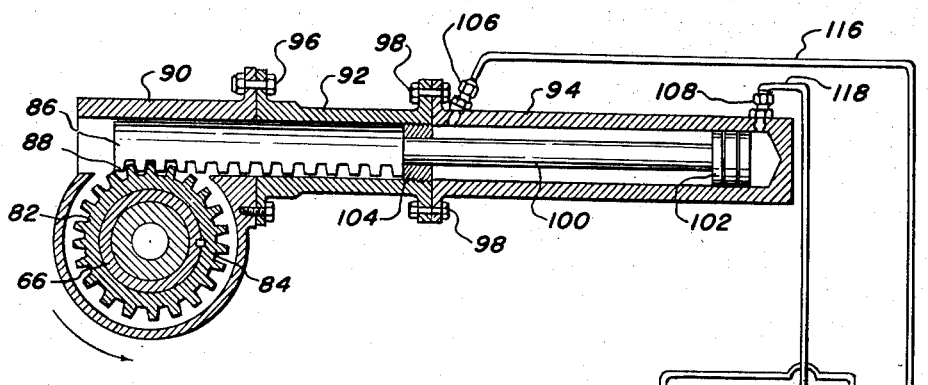
Fig. 6 is a section on line 6—6 of Fig. 2.

The initial movement of pinion 82 will rotate cam 66 from the position shown in Fig. 2, this rotation being counterclockwise as indicated by the arrows in Fig. 6. During this initial movement cam 60 will be moved axially to the left as viewed in Fig. 4 until stop 76 engages the end 80 of member 66. This axial movement will move lugs 50 out of notches 52 and as the rack continues to move pinion 82 the lugs 50 will pass over the end of sleeve 36. During this further movement cam 66, by reason of the engagement of its inclined teeth with the mating teeth of cam 60, will drive the latter and with it the axle extension 42 which is pinned to cam 60. When the pinion 82 reaches the end of its 180° movement and no longer exerts torque on cam 66 lugs 50 will be in registry with notches 52 and compression spring 54 will urge cam 60 to the right and with it axle extension 42, dropping the lugs 50 into the notches 52, thus locking the wheel axle in its vertical position.

Due to the larger area presented by the horizontal wheels and the buoyancy of the bumper 46, it is possible to safely land a helicopter on ground which would be too soft to support the ship on its wheels in their normal position.

When the pilot has taken off he can again operate the valve 114 which will retract rack 86 into the housing 90 and its extension 92 causing the pinion 82 to rotate 180° in a reverse direction to unlock the spindle assembly and rotate the latter into its original position in which the wheel axle 38 is horizontally disposed. At this point the lugs 50 will drop into the notches 52 in their original relationship.

It will be evident that as a result of this invention it has not only been made possible to land a helicopter more safely on soft ground or snow but it has been made possible to land on terrain on which it was formerly unwise to attempt a landing. It will further be evident that in using the wheels in their horizontal position for landing on soft ground the resilience of bumper 46 has been substituted for the natural resilience of the tires upon initial ground contact while in both modes of landing the oleo struts are effective.

While only a single embodiment of the invention has been shown and described herein, it will be understood that various changes in the construction and arrangement of the parts may be resorted to without departing from the scope of the invention.

I claim:

1. Landing gear for rotary wing aircraft including a wheel and axle assembly, an extension extending from said axle at an angle of approximately 45°, a supporting member in which said extension is journalled for rotation between two operative positions of said gear, one in which said axle is horizontal and another in which said axle is vertical, cooperating locking elements carried by said extension and said member and engageable to lock said assembly in either of said operative positions of said gear, means operatively connected to said extension for rotating said extension through 180° to move said assembly from one operative position to the other, cam means operatively connected to said locking elements for releasing said locking elements responsive to the initial rotative movement of said extension and resilient means operatively connected to said extension and said member and cocked by the releasing movement of said cam means for automatically re-engaging said locking elements at the end of said 180° movement of said extension.

2. Landing gear for rotary wing aircraft including a wheel and axle assembly, an extension extending from said axle at an angle of approximately 45°, a supporting member in which said extension is axially movable and also rotatable between two operative positions of said gear, one in which said wheel is rotatable on said axle in vertical planes and the other in which said axle is downwardly directed and said wheel lies in horizontal planes, cooperating locking elements carried by said member and extension for locking said extension against rotation relative to said member in either of said operative positions of said assembly, means operatively connected to said extension for moving said extension axially of said member to release said locking elements including a cam member carried by said supporting member, biasing means engaging said extension and urging the same axially in a direction to engage said locking elements, and drive means coupled with said moving means for actuating said cam member to move said extension axially and release said locking elements and subsequently to rotate said axle assembly into its other operative position.

3. Landing gear for rotary wing aircraft including an oleo strut supported on said aircraft, a support at the lower end of said strut having a sleeve disposed at approximately 45° to the vertical plane including the longitudinal axis of said strut, a normally horizontal wheel axle having a 45° extension journalled in said sleeve, a wheel journalled on said axle having a pneumatic bumper located at the extremity of said axle, means operatively connected to said extension for locking said extension to said sleeve in two angular positions of said extension relative to said sleeve, one in which said wheel axle is horizontal and another in which said axle is vertical and downwardly directed, said locking means being unlocked by axial movement of said extension, pilot operative means operatively connected to said extension for turning said extension through 180° relative to said sleeve to move said axle from either of said positions into the other position including a member mounted to rotate about the axis of said extension, and means included in said pilot operative means for moving said extension axially in said sleeve upon initial rotating movement of said member to unlock said extension.

4. Landing gear for rotary wing aircraft including a wheel and axle assembly, means operatively connected to said assembly for supporting said assembly in two ground engaging positions of said wheel, one in which said wheel lies in vertical planes and another in which it lies in horizontal planes, means operatively connected to said assembly for releasably locking said assembly in either of said positions, and means for automatically releasing said locking means and moving said assembly from either position into the other including a pinion gear rotatably mounted in said supporting means, a driven member for rotating said assembly, and a driving member driven by said pinion for rotating said driven member, said driving and driven members having cooperating cam faces operative to release said locking means upon initial movement of said driving member by said pinion.

5. A landing gear as claimed in claim 4 in which a spring is compressed by the initial unlocking movement of said driving member and urges said cam faces into registering position following movement of said assembly to re-engage said locking means.

6. A landing gear as claimed in claim 5 in which piston and cylinder elements are provided, one of which is movable, and a rack connected to the movable element is provided for driving said pinion.

7. Landing gear for rotary wing aircraft including a wheel and axle assembly, an extension extending from said axle at an angle of approximately 45°, a supporting member in which said extension is journalled for rotation between two operative positions of said wheel and axle, one in which said axle is horizontal and another in which said axle is vertical, cooperating locking elements carried by said extension and said member and engageable to lock said wheel and axle in either of said operative positions of said gear, means operatively connected to said extension for rotating said extension through 180° to move said wheel and axle from one operative position to the other, and cam means operably connected to one of said locking elements for releasing said locking elements responsive to the initial movement of said rotating means.

8. Landing gear for rotary wing aircraft including an oleo strut, means for mounting a wheel at the lower end of said strut comprising an oblique bearing, an axle assembly including a normally horizontal axle having an oblique extension journalled in said bearing, a wheel having a peripheral pneumatic tire and a pneumatic bumper mounted at the end of said axle, said wheel being journalled on said axle, and means operatively connected to said axle assembly for moving said axle assembly between two operative positions, one in which said axle is horizontal and another in which said axle is downwardly directed.

9. Landing gear for rotary wing aircraft including a wheel and a wheel axle, said wheel having a landing surface engaging periphery and a landing surface engaging side, an extension extending from said axle at an angle of approximately 45°, a supporting member in which said extension is journalled for rotation about an axis, and means operatively connected to said extension for rotating said extension and said wheel between alternate positions in which the periphery and side respectively of said wheel are adapted for engagement with a landing surface.

10. Landing gear for rotary wing aircraft including a wheel and a wheel axle, said wheel having a landing surface engaging periphery and a landing surface engaging side, an extension extending from said axle at an angle of approximately 45°, a supporting member in which said extension is journalled for rotation about an axis, means operatively connected to said extension for rotating said extension and said wheel between alternate positions in which the said periphery and side respectively of said wheel are adapted for engagement with a landing surface, and means operatively connected to said wheel for locking said wheel in each of its alternate positions.

11. Landing gear for rotary wing aircraft including a wheel and a wheel axle, said wheel having a landing surface engaging periphery and a landing surface engaging side, an extension extending from said axle at an angle of approximately 45°, a supporting member in which said extension is journalled for rotation about an axis, means operatively connected to said extension for rotating said extension and said wheel between alternate positions in which the said periphery and side respectively of said wheel are adapted for engagement with a landing surface, and means for locking said wheel in each of its alternate positions including a cooperating notch and lug operatively connected between said extension and said supporting member.

12. Landing gear for rotary wing aircraft including a wheel and a wheel axle, said wheel having a landing surface engaging periphery and a landing surface engaging side, an extension extending from said axle at an angle of approximately 45°, a supporting member in which said extension is journalled for rotation about an axis, means operatively connected to said extension for rotating said extension and said wheel between alternate positions in which the said periphery and side respectively of said wheel are adapted for engagement with a landing surface, means for locking said wheel in each of its alternate positions including a cooperating notch and lug operatively connected between said extension and said supporting member, and means operatively connected to said extension for moving said extension axially to disengage said notch and lug.

References Cited in the file of this patent

UNITED STATES PATENTS

| 1,257,413 | Sloper | Feb. 26, 1918 |
| 1,910,423 | Bolas et al. | May 23, 1933 |
| 2,332,844 | De Muyser | Oct. 26, 1943 |
| 2,651,480 | Pullin | Sept. 8, 1953 |

FOREIGN PATENTS

| 672,472 | France | Sept. 16, 1929 |